United States Patent [19]
Toman

[11] 3,715,757
[45] Feb. 6, 1973

[54] RADIO GUIDANCE SYSTEM WITH SEPARATE TRANSMISSION OF A STANDARD FREQUENCY SIGNAL TO ENHANCE THE DISCRIMINATION OF THE RECEIVER

[75] Inventor: Donald J. Toman, Pleasantville, N.Y.

[73] Assignee: Tull Aviation Corporation, Pleasantville, N.Y.

[22] Filed: July 13, 1970

[21] Appl. No.: 54,510

[52] U.S. Cl..............343/108 R, 325/416, 343/102, 343/107
[51] Int. Cl..................................................G01s 1/16
[58] Field of Search...325/416, 418, 419; 343/108 R, 343/107, 102

[56] References Cited

UNITED STATES PATENTS

| | | | |
|---|---|---|---|
| 2,113,260 | 4/1938 | Usselman | 325/416 |
| 2,602,161 | 7/1952 | Proskauer | 343/107 |

*Primary Examiner*—Benjamin A. Borchelt
*Assistant Examiner*—Richard E. Berger
*Attorney*—Curtis Ailes

[57] ABSTRACT

A system for a craft to be guided including a receiver operable to receive guidance signals in a predetermined band of radio frequencies, the receiver also being capable of receiving a separate fixed standard frequency signal from a ground station for control of the receiver to enhance the discrimination function in discriminating the guidance signals.

21 Claims, 5 Drawing Figures

INVENTOR
DONALD J. TOMAN
BY Curtis Ailes
ATTORNEY

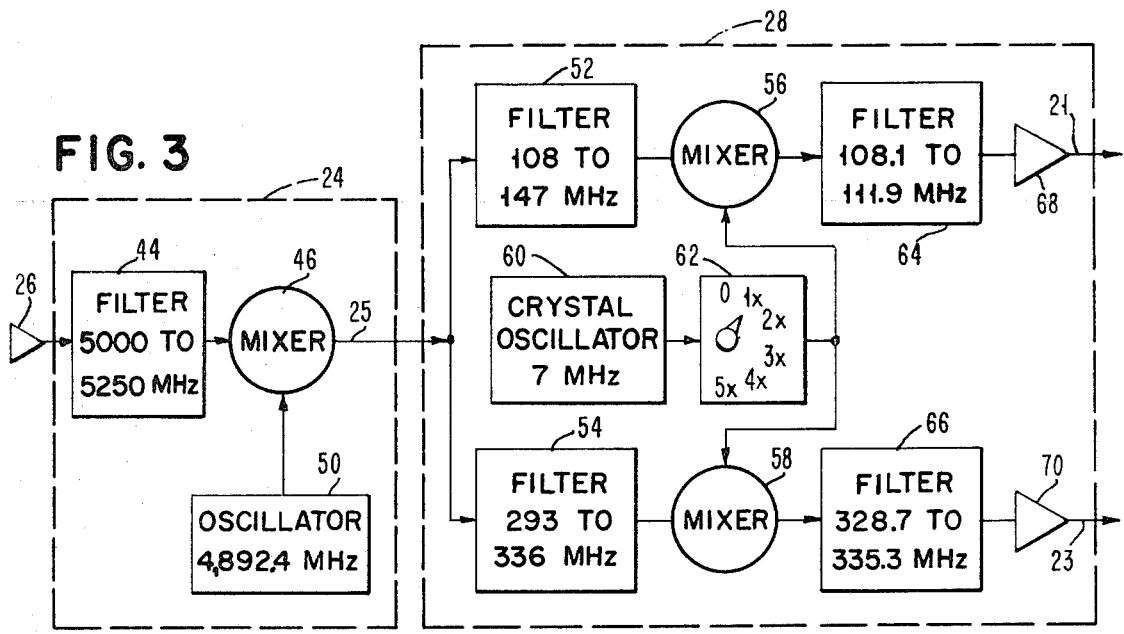
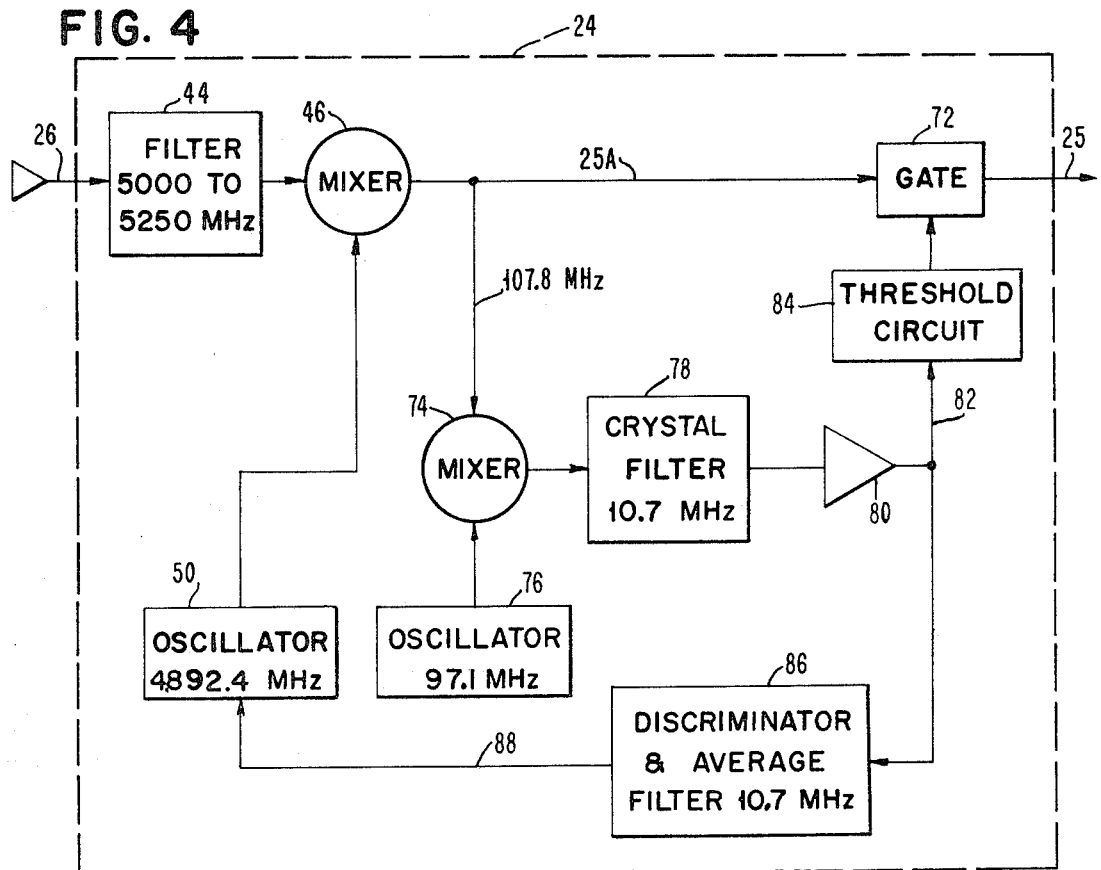

RADIO GUIDANCE SYSTEM WITH SEPARATE TRANSMISSION OF A STANDARD FREQUENCY SIGNAL TO ENHANCE THE DISCRIMINATION OF THE RECEIVER

This invention relates to guidance systems, and to guidance systems which are particularly useful for aircraft and which may be operated at microwave frequencies. The systems of the present invention are particularly useful for the guidance of aircraft in descent towards an airport for landing. Accordingly, the invention is described in terms of this function. However, it will be understood that the invention is also very useful in systems providing other guidance functions for aircraft, land craft, or water craft.

Present aircraft instrument landing systems, sometimes referred to as ILS, are operable at very high frequencies (VHF) frequencies. These present systems represent a large existing investment in airport ground installations and also in aircraft equipment installations. However, at the VHF frequencies, there are many airport sites where the conventional ILS simply cannot be operated successfully because of the problems of reflections of signals which make the transmitter signals ambiguous and unusable to the aircraft. Furthermore, the VHF systems are very expensive, which further limits the number of installations, and prevents installations at many airports where they are needed.

Accordingly, it is one object of the present invention to provide an improved low-cost microwave aircraft guidance system which can be effectively used at otherwise difficult airport sites.

In carrying out the present invention, in one form thereof, ILS localizer and guide slope signals are transmitted at microwave frequencies and converted in the receiver by a direct subtraction conversion to obtain signals in the normal VHF-ILS frequency bands. In order to accomplish this purpose, it is necessary to provide for a local oscillator in the receiver which is extremely accurate and therefore expensive. Furthermore, for microwave frequencies as high as the Ku band from 15,400 MHz (megacycles per second) to 15,700 MHz, the accuracy and stability required of the local oscillator is virtually unattainable by the usual means. The problem of maintaining frequency accuracy and stability in the receiver is also present at other frequencies, and for other guidance functions.

Accordingly, it is another object of the present invention to provide a guidance system having improved means for automatically matching the receiver frequency standards to the transmitter frequencies.

Other objects and advantages of the invention will be apparent from the following description and the accompanying drawings.

In carrying out the invention there is provided an improved guidance system comprising apparatus for a craft to be guided including a receiver operable to receive guidance signal within a predetermined band of radio frequencies from ground stations, said receiver including means for receiving a separate fixed standard frequency signal from a ground station and operable to control said receiver to enhance the discrimination function of said receiver in discriminating the desired guidance signals within said predetermined band of frequencies from other signals.

In the accompanying drawings:

FIG. 3 is a more detailed schematic circuit diagram illustrating preferred features of the microwave receiver and converter, and the frequency translator which may be employed in the system of FIG. 1.

FIG. 4 is a schematic circuit diagram showing further details of the microwave receiver and converter.

Figure 5:
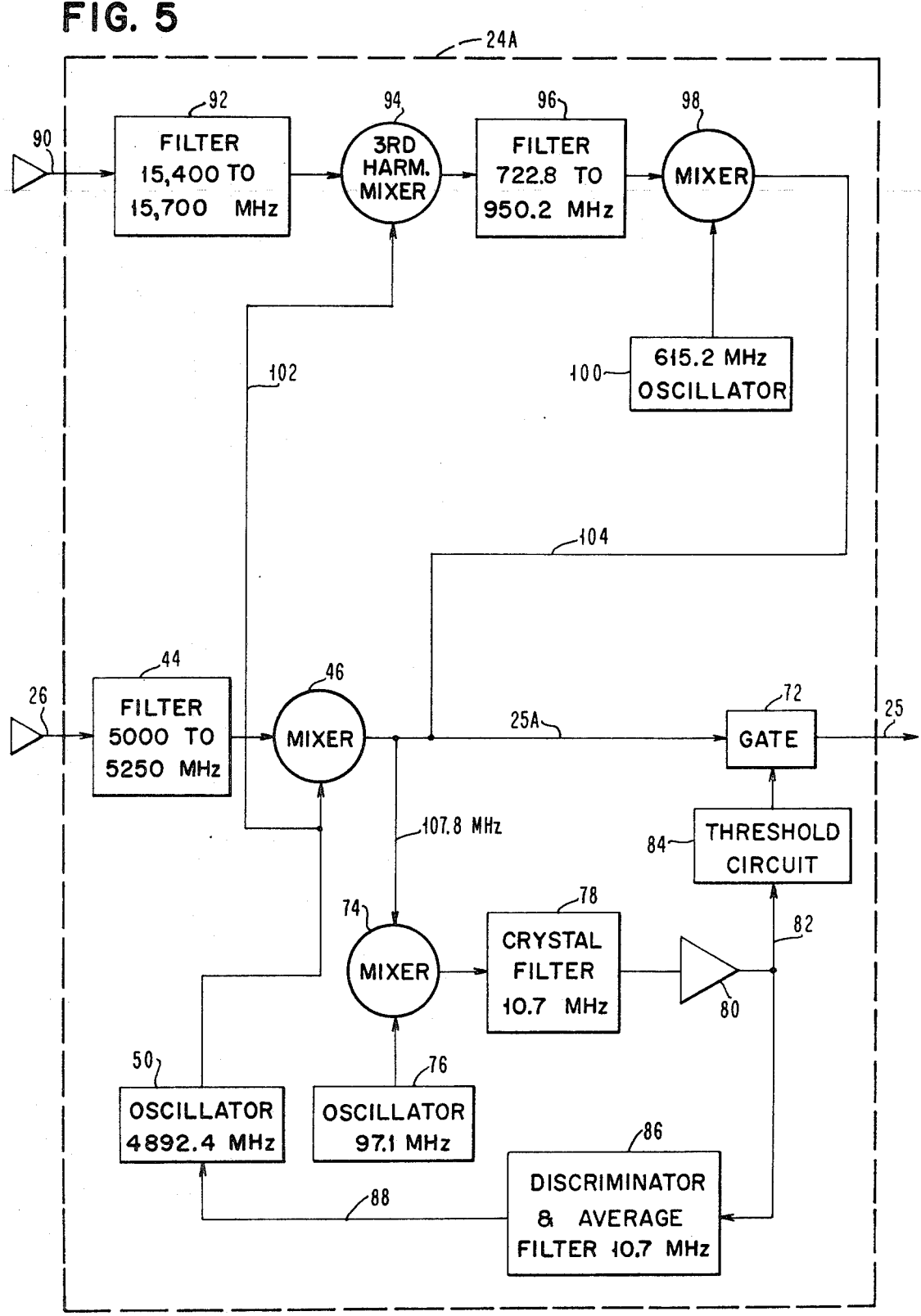

And FIG. 5 is a schematic circuit diagram corresponding to FIG. 4 and showing details of a modification of the microwave receiver and converter in which the receiver is operable at two microwave frequency bands.

In the specification, reference is made to airport ground stations. However, since the invention is usable for guidance functions for aircraft, for purposes other than for landing, and since the invention is usable also for water craft and land craft, it will be understood that the ground stations are not necessarily located at airports.

Figure 1:
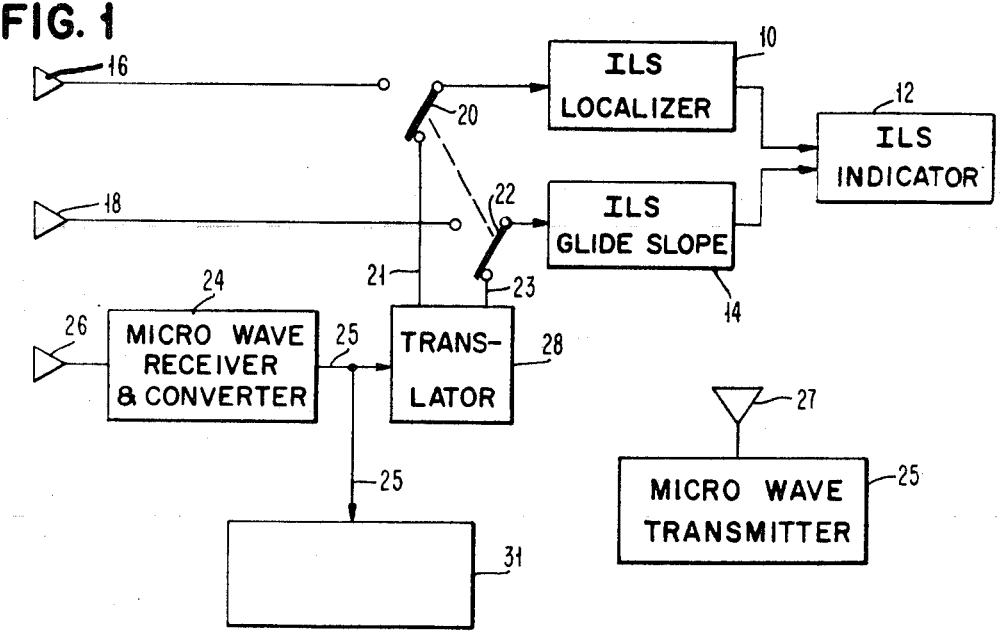
FIG. 1 is a schematic circuit diagram showing the arrangement of a transmitter and a receiver system for installation in an aircraft for carrying out the present invention.

Referring more particularly to FIG. 1, a preferred system in accordance with the present invention is illustrated to include an ILS localizer receiver 10 and an ILS guide slope receiver 14. Both of these receivers feed signals to an ILS indicator 12. The localizer receiver 10 is operable in the normal VHF localizer frequencies in the band from 108 to 112 MHz. Such signals may be received from a localizer antenna 16 through a switch schematically shown at 20. The glide slope receiver is operable to receive signals at the usual glide slope frequency band from 328.6 to 335.4 MHz. Such signals may be received from a slide slope antenna 18 through a switch element schematically shown at 22 and operable together with the switch element 20. With the exception of the switch elements 20 and 22, the components of the system thus far described may be conventional ILS components.

In accordance with the present invention, a microwave receiver and converter 24 is provided and connected to receive microwave ILS signals through a microwave antenna 26. These signals may be transmitted from a ground-based microwave transmitter schematically shown at 25 through an antenna 27. The microwave signals include signals which are in conventional ILS format and they are converted within the receiver-converter 24 and in a translator 28 to signals which fall within the conventional glide slope and localizer frequency bands. Thus, these signals can be supplied directly to the localizer and glide slope receivers 10 and 14 through connections 21 and 23 and the switch 20 and 22. Signals within the same microwave frequency band may also be received and converted by the receiver 24 and supplied through connection 25 to another navigational aid apparatus 31. Apparatus 31 may comprise a system which is a complete substitute for the localizer 10-glide slope 14 system and which provides more sophisticated navigational or landing aids. On the other hand, the apparatus 31 may simply supplement the information available from the localizer and glide slope receivers 10 and 14. For instance, the apparatus 31 may be a distance measuring equipment and may employ a portion of the microwave frequency band received by receiver 24 which is not required for the ILS localizer and glide slope functions. The terms "guidance" and "guidance system" are used in this specification to refer to all radio frequency systems by which information is transmitted and received which is useful in the guidance of a craft. This includes all of the functions described above, as well as other similar functions. At least some of these functions are also referred to from time to time as navigation functions, and the systems as navigation systems.

Certain bands of microwave frequencies have been set aside and allocated for guidance functions. These include the C band from 5,000 to 5,250 MHz, and the Ku band from 15,400 to 15,700 MHz. The preferred embodiment of this invention is described in this specification in terms of operation in the C band. However, it will be understood that the invention may be employed also for operations at Ku band, or at some other microwave frequency which may be available for this purpose. Both the C band and the Ku band are each wide enough to encompass a range of frequencies having an absolute difference between the lowest and highest frequency within the band which exceeds the difference between the lowest frequency in the conventional localizer band and the highest frequency in the conventional glide slope band. Thus, a simple conversion by a simple frequency subtraction in the C band receiver and converter 24 is sufficient to convert the C band localizer and glide slope signals to the appropriate respective frequencies for use in the localizer and glide slope receivers 10 and 14. This statement is true only if the localizer and the glide slope signals are transmitted within appropriate matched subbands within the microwave band received by the receiver 24. Appropriate sub-bands for this purpose are illustrated for instance in FIG. 2 at 30 and 32.

The localizer signals may be transmitted in the sub-band 30 from 5,000.4 to 5,004.4 MHz, and the glide slope signals may be transmitted in the complementary sub-band 32 from 5,221.0 to 5,227.8 MHz. These frequency limits for the sub-bands 30 and 32 are shown above the representation of the bands in FIG. 2. The frequency conversion within the receiver 24 consists of a simple subtraction of 4,892.4 MHz, resulting in a converted sub-band 30 in the range from 108.0 to 112.0 MHz, and a converted sub-band 32 in the range from 328.6 to 335.4 MHz. These frequency bands correspond to the conventional VHF bands for the localizer and glide slope functions.

Figure 2:
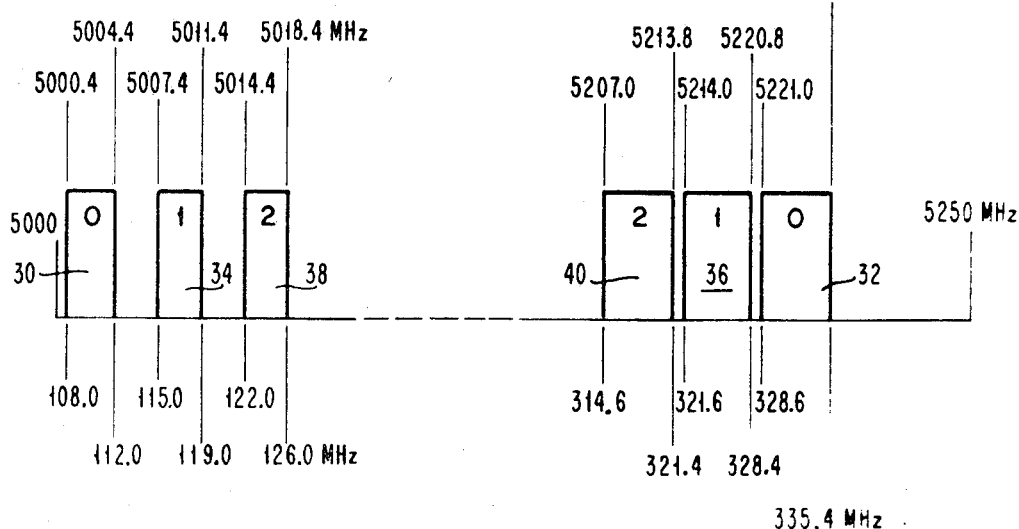
FIG. 2 is a chart illustrating a particular allocation of frequencies which may be employed in carrying out the principles of the invention.

The translator 28 of FIG. 1 provides for the employment of other paired sub-bands by adding and subtracting 7 MHz frequency increments with the converted C band signals. Thus, as illustrated in FIG. 2 at 34, localizer signals may be transmitted in the sub-band from 5,007.4 to 5,011.4 MHz, and when converted they result in localizer signals in a converted band from 115.0 to 119.0 MHz. By subtracting seven MHz from these signals in translator 28, they are translated to the conventional localizer frequency band from 108.0 to 112.0 MHz. A paired sub-band for transmission of glide slope signals is shown at 36 in the range from 5,214.0 to 5,220.8 MHz. When this sub-band is converted in the receiver and converter 24, the resultant signals are in a converted sub-band from 321.6 to 328.4 MHz. By adding 7 MHz to these signals in translator 28, they are translated to the conventional glide slope signal band from 328.6 to 335.4 MHz. Thus, sub-bands 34 and 36 are complementary sub-bands, the same integral multiple (1) of 7 MHz being subtracted from sub-band 34 and added to sub-band 36 to obtain the conventional localizer and glide slope frequencies. By the same process, additional multiples of seven MHz may be added and subtracted in the translator to provide additional complementary sub-bands. For instance, the sub-bands 38 and 40 are based respectively upon the subtraction and addition of 14 MHz (the second integral multiple of 7) in the translator 28. By this simple means, as many complementary frequency sub-bands may be provided as are needed. It is proposed for instance to provide a total of six pairs of complementary microwave sub-bands. Since 39 pairs of channels may be selected by the conventional localizer and glide slope receivers 10 and 14 from each pair of sub-bands, this system will provide 234 new ILS channels in a microwave frequency band in addition to the 39 ILS channels already available at the conventional VHF transmission frequencies.

It is quite apparent that the frequency allocations suggested by FIG. 2 for the ILS functions leave quite a bit of the C band from 5,000 to 5,250 MHz unused. Accordingly, it is contemplated that the additional apparatus 31 supplied through connection 25 may employ these otherwise unused portions of the C band for other guidance signal functions such as for distance measurement equipment. As another alternative, the equipment 31 may completely replace the ILS function and the microwave signals received and converted in receiver 24 may include information represented by forms of modulation such as frequency modulation which are different from the amplitude modulation presently used for the ILS functions. Thus, the same microwave band may be employed both for conventional ILS amplitude modulated signals and for frequency modulated signals for more sophisticated guidance systems — while maintaining complete compatibility with the existing ILS systems.

FIG. 3 is a more detailed schematic diagram showing the C band antenna 26, the receiver and converter 24, and the translator 28. The receiver 24 is shown to include a filter 44 to limit the input signal to the C band from 5,000 to 5,250 MHz, and a mixer 46 in which the signal is mixed with the output from a crystal oscillator operating at 4,892.4 MHz to obtain difference frequencies on the receiver and converter output at 25. This output is provided to the translator 28.

The signals at 25 are fed to two separate channels within translator 28 beginning with the filters 52 and 54. Filter 52 is a band pass filter which passes all of the sub-bands for the localizer signals, all of these sub-bands being encompassed in the frequency range from 108 to 147 MHz. Similarly, the filter 54 limits its associated channel to a range from 293 to 336 MHz encompassing all of the sub-bands for the glide slope signals. Particular sub-bands are then selected by providing different translator frequencies to the mixers 56 and 58. These different translator frequencies are provided from a crystal oscillator 60 operating at 7 MHz and a frequency multiplier 62 which may be selectively operated to multiply by a factor of 0 through 5 to thereby select pairs of sub-bands designated by those factor numbers. When the multiplier 62 is set on zero to select the zero sub-bands, the frequency translator circuit is turned off so that there is no addition or subtraction of frequency in the translator. While this portion of the translator has been described in terms of a variable frequency multiplier, it will be understood that it is an appropriate alternative to provide, for instance a 35 MHz oscillator and a frequency divider which may be selectively operated to divide by different factors to provide the appropriate frequency translation corrections.

The translator 28 also preferably includes output filters 64 and 66 designed respectively to pass the conventional localizer and glide slope frequency bands for transmission to the localizer and glide slope receivers at connections 21 and 23. If necessary, amplifiers 68 and 70 may be provided.

While FIGS. 2 and 3 have been described in terms of a translator which operates with uniform 7 MHz intervals, it will be apparent that it would be practical to provide a system in which two different translation increment frequencies might be employed. Thus, the 7 MHz interval might be used for separation of the glide slope sub-bands, and some lesser interval such as 4 MHz might be used for separation of the localizer sub-bands. Furthermore, while the invention is described in terms of employing a first complementary pair of sub-bands 30 and 32 which require no translation frequency change, it is possible to employ only sub-bands which are subjected to translation frequency changes, and to omit the outermost complementary pairs of sub-bands. In this way, the total spectrum space spanned by the complementary sub-bands is confined to a smaller total fraction of the C band. These modifications of the invention are not specifically illustrated.

The system as described thus far, by reference to FIGS. 1, 2, and 3, forms a portion of the subject matter described and claimed in a copending patent application, Ser. No. 54,456 filed concurrently herewith by Donald J. Toman and Warren Hundley for a GUIDANCE SYSTEM, now abandoned, and assigned to the same assignee as the present application.

In accordance with the present invention, a fixed frequency standard signal is transmitted by the ground station transmitter along with the information signals. This fixed frequency standard signal is employed to automatically control the frequency of the crystal oscillator 50 in the microwave receiver and converter 24. FIG. 4 shows the details of this feature of the invention.

FIG. 4 is a schematic circuit diagram showing further details of the microwave receiver and converter 24. The oscillator 50 is automatically controlled by means of a frequency signal received from the transmitter. A gate circuit 72 is preferably provided to prevent the transmission of ILS signals to connection 25 and to the translator, unless a frequency standard signal of acceptable amplitude is being received and detected. The fixed frequency standard signal may be within the C band, for instance at 5,000.2 MHz. This standard frequency signal is converted in the mixer 46, along with the ILS information signals, by subtraction of the output of the oscillator 50 at 4,892.4 MHz. This results in a difference signal of 107.8 MHz derived from the standard frequency signal at connection 25A. That signal is supplied to a mixer 74 where a frequency of 97.1 MHz supplied from an oscillator 76 is subtracted. The resultant difference signal of 10.7 MHz is filtered by a crystal filter 78 and amplified by an amplifier 80. The crystal filter 78 may be similar to a standard frequency modulation broadcast intermediate frequency filter, and the amplifier 80 may correspond to a standard frequency modulation broadcast receiver intermediate frequency amplifier. The output of amplifier 80 is supplied at connection 82 to a threshold circuit 84 which controls the gate 72 to open that gate whenever the frequency standard signal is above a satisfactory threshold value. The output of amplifier 80 is also passed to a frequency discriminator and average filter 86 which supplies a direct current output at connection 88 to control the operation of the oscillator 50. Thus, if the signal received by discriminator 86 is slightly above 10.7 MHz, a DC signal will be produced on connection 88 to control the oscillator 50 to slightly increase the frequency of that oscillator to thereby reduce the difference frequencies at the output of the mixer 46. On the other hand, if the signal received by the discriminator 86 is below 10.7 MHz, the DC control signal at connection 88 will be of the opposite polarity to decrease the frequency of oscillator 50 to thereby increase the difference frequencies produced at the output of mixer 46. Thus, the frequency of the converter within the microwave receiver is automatically controlled by a frequency standard signal from the transmitter. And thus the matching of the local receiver oscillator 50 to each transmitter is assured, without the necessity for the additional expense required in providing an extremely accurate local oscillator and in adjusting the local oscillator from time to time to compensate for changes due to aging and other causes such as physical vibrations and mechanical shock.

Since all ground stations will radiate the same reference frequency, the receiver need not be tuned or adjusted as it approaches an airport. Furthermore, as the aircraft approaches the desired airport, the reference signal from the ground station at that desired airport will predominate and capture and control the local oscillator. This will be true even though other ground stations may be within receiving range because the system, as shown and described above, operates with the well known frequency modulation limiting effect such that the discriminator will recognize the strongest signal to the exclusion of all other signals at or near the frequency of the local reference signal.

Another advantage of transmitting a reference frequency signal is that it substantially eliminates the tuning error resulting from Doppler frequency shift on the transmitted microwave signals experienced at the aircraft because of its approach to the transmitter. This frequency shift can be substantial, reaching about 3 kilohertz for a typical approach to a Ku band transmitter. The reduction in the tuning error occurring from the Doppler effect results from the fact that the frequency of the reference signal and the frequency of the information signal are nearly equal and therefore experience nearly the same Doppler frequency shift. Since the position of the information signal in the correct channel depends primarily on the accuracy of the frequency difference between the reference signal and the information signals and this frequency difference is quite small in comparison with either the reference signal frequency or the information signal frequency, the Doppler frequency shifts are effectively cancelled.

The automatic frequency control of the receiver, as described just above, not only permits a cost reduction in the receiver, but for isolated ground stations it also permits the use of relaxed frequency specifications on the ground station. This results from the previously described effect that the tuning accuracy is primarily dependent on the accuracy of the frequency difference between the reference signal and the information signals. For the embodiment described this frequency difference varies between 0.3 MHz and 228 MHz. This is at least one order of magnitude less than the transmitted frequencies and can be precisely controlled at much less expense.

In accordance with the present invention, in congested areas, the ground stations are preferably all synchronized in frequency with a single master station so that the standard frequency signal is absolutely uniform no matter which ground station transmitter the signal is received from.

Another advantage with this feature of the invention is that a single frequency standard may be employed to control all of the aircraft guidance receiver functions, even if some of those functions are performed by Ku band microwave transmissions, while the standard frequency is transmitted in C band. Alternatively, the standard frequency may be transmitted in the Ku band rather than in the C band.

If the system for microwave ILS operations, as described in connection with FIGS. 1, 2, and 3, is to be employed at Ku band microwave frequencies, the requirements for stability in the local oscillator of the receiver are extremely high. Accordingly, the reference frequency system disclosed in connection with FIG. 4 is quite important in order to make Ku band operations practical.

The automatic frequency control system of the present invention is also particularly advantageous because it does not require a broad band frequency search, the automatic frequency control loop of the receiver always expects a signal in its own particular narrow band. The oscillator 50, while automatically adjustable in frequency, is always operable within a frequency range which is narrow enough to be within the discrimination range of the discriminator 86. Stated another way, the frequency of the oscillator 50 is always close enough to its nominal frequency to enable the automatic frequency control loop of the receiver to pick up the standard frequency signal and to "lock" onto the standard frequency signal. For this purpose, the standard frequency signal is placed in its own unique frequency band so that the receiver easily distinguishes the reference frequency signal from the guidance signal carrier. Furthermore, no connections are required to the ILS receivers 10 and 14 of FIG. 1. This is important because it is desired to provide the microwave receiver and converter, and the translator, as a separate equipment which may be added on to standard ILS localizer and glide slope equipments as they presently exist in an aircraft, and to accomplish this with a minimum of interconnections with the existing equipment. Furthermore, by employing a single standard frequency signal, which is not modulated or used for information transmission of any other kind, it is possible to employ an extremely narrow band width signal, essentially a pure single frequency signal which thereby provides an optimum in signal-to-noise discrimination on the basis of frequency.

The ground station transmitter or transmitters have not been shown or described in detail. They may be constructed and may operate in a conventional manner, the ILS signals being generated in the usual ILS format, but with the exception that transmission is at microwave frequencies. Typically, two transmitters may be employed, including a glide slope transmitter which is located at the end of the runway first approached by the aircraft, and a separate localizer transmitter which may be located beyond the far end of the runway (the "roll-out" end) to provide for the localizer function during touchdown and roll-out. Alternatively, a single transmitter apparatus may be employed for all of the transmitter functions and located at the near end of the runway. This may be desirable for economy and portability of the apparatus, but it does not provide the localizer function during touchdown. In this paragraph, the references to transmitter locations are understood to pertain primarily to the transmitter antenna locations. However, with microwave equipment, the antenna and the rest of the transmitter system are generally located together. The localizer transmitter includes means for transmitting the "standard" frequency signal along with the localizer signals.

The fixed value single frequency reference signal is transmitted at a microwave frequency of 5,000.2 MHz. The localizer and glide slope frequencies are developed by adding to the frequency reference signal small fixed offset frequencies as required for the desired channel.

As previously mentioned above, the present system, as thus far described, is specifically disclosed in terms of operation at C band. It will be understood that essentially the same system configuration is also effective at Ku band by simply changing the operating frequencies of the components. This statement applies not only to the portions of the system illustrated in FIGS. 1, 2, and 3, but also to the automatic frequency control arrangements described in connection with FIG. 4. Thus, the fixed frequency employed for the automatic frequency control function may be transmitted within the Ku band.

FIG. 5 is a schematic circuit diagram which generally corresponds to FIG. 4, and which illustrates still a further modified microwave receiver and converter 24A. The receiver and converter 24B is substantially similar to the receiver and converter 24A of FIG. 4, with the exception that it includes means for receiving signals at another microwave frequency band such as Ku band, by means of added components and interconnections. The added components include a Ku band antenna 90, a filter 92 for discriminating the Ku band signals, a mixer 94, an intermediate frequency filter 96, another mixer 98, and a local oscillator 100. Through a connection 102, the mixer 94 is provided with the frequency 4,892.4 MHz from the oscillator 50. It is a third harmonic mixer which responds to the third harmonic frequency, 14,677.2 MHz, of the oscillator 50 output. This third harmonic frequency is effectively subtracted from the Ku band frequencies passed through the filter 92, the difference frequencies being discriminated by the filter 96 and passed to the mixer 98. The local oscillator 100 provides a frequency of 615.2 MHz which is also subtracted from the signal entering mixer 98, and the difference frequencies are supplied through a connection 104 to the conductor 25A. These difference frequencies are in a band which corresponds exactly to the band of frequencies provided to connection 25A in response to C band signals through filter 44 and mixer 46. Thus, the modification of FIG. 5 illustrates a universal system which is capable of receiving localizer and glide slope signals either on Ku band, or on C band, the signals received on either band being converted by an oscillator 50A stabilized by a C band automatic frequency control signal at a frequency, for instance, of 5,000.2 MHz.

It is another interesting feature of the embodiment of FIG. 5 that the standard frequency (automatic frequency control signal) may also be transmitted and received at Ku band. For instance, the Ku band standard frequency may be 15,400.2 MHz. Successive subtractions of 14,677.2 MHz in mixer 94 and 615.2 MHz in mixer 98 provide the required control frequency of 107.8 MHz at the input to mixer 74. Thus, the system illustrated in FIG. 5 is capable of receiving guidance information signals either at Ku band or at C band, while receiving automatic frequency control signals either at C band or at Ku band, and the automatic frequency control signals need not be in the same band as the guidance information signals.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. An improved guidance system comprising apparatus for a craft to be guided including a receiver operable to receive guidance signals within a predetermined band of radio frequencies from ground stations,
    said receiver including means for receiving a separate fixed standard frequency signal from a ground station and operable to control said receiver to enhance the discrimination function of said receiver in discriminating the desired guidance signals within said predetermined band of frequencies from other signals,
    said receiver being operable to receive guidance signals within two predetermined bands of frequencies from ground stations,
    and said separate fixed standard frequency signal being within one of said predetermined bands of frequencies.

2. A system as claimed in claim 1 wherein
    one of said predetermined bands of frequencies is in the C band,
    and the other of said predetermined bands of frequencies is in the Ku band.

3. A system as claimed in claim 2 wherein
    said separate fixed standard frequency signal is within the C band.

4. A system as claimed in claim 2 wherein said separate fixed standard frequency is within the Ku band.

5. A system as claimed in claim 3 wherein
    said means for receiving said separate fixed standard frequency signal to enhance discrimination comprises a local oscillator having a controllable oscillation frequency which is stabilized by a signal derived from the fixed standard frequency signal,
    the fundamental oscillator frequency being employed to discriminate C band signals,
    and the third harmonic frequency of said oscillator being used to discriminate said Ku band signals.

6. An improved guidance system comprising apparatus for a craft to be guided including a receiver operable to receive guidance signals within a predetermined band of radio frequencies from ground stations,
    said receiver including means for receiving a separate fixed standard frequency signal from a ground station and operable to control said receiver to enhance the discrimination function of said receiver in discriminating the desired guidance signals within said predetermined band of frequencies from other signals,
    said receiver including a translator selectively operable to translate incoming signals from different predetermined sub-bands to a predetermined intermediate frequency band usable within said receiver,
    said sub-bands having different fixed frequency differences from said fixed standard frequency.

7. A system as claimed in claim 6 wherein
    said receiver and said translator are arranged to receive and translate at least two different guidance signals on two different predetermined pairs of sub-bands,
    said translator being selectively operable to translate incoming signals from different predetermined pairs of sub-bands to a predetermined pair of intermediate frequency bands usable within said receiver,
    said sub-bands having different fixed frequency differences from said fixed standard frequency.

8. An improved guidance system comprising apparatus for a craft to be guided including
    a guidance function receiver operable to receive guidance signals in a first predetermined band of frequencies and operable in response to said guidance signals for generating a signal indicating deviations from a predetermined path,
    means connected to said receiver for indicating said deviation signals for course corrections,
    a microwave receiver operable to receive guidance signals within a predetermined band of microwave frequencies from ground stations,
    said microwave receiver including a frequency converter means operable by combination with at least one fixed frequency to convert microwave frequency guidance signals received thereby to signals falling within said first predetermined band of frequencies,
    said microwave receiver being connected to supply said converted frequency signals respectively to said guidance function receiver,
    said microwave receiver including means for receiving a fixed standard frequency signal from a ground station and operable to determine the fixed frequency for conversion of the microwave frequency guidance signals.

9. An improved aircraft guidance system comprising apparatus for the aircraft including
   a localizer receiver operable to receive guidance signals in a first predetermined band of frequencies and operable in response to said guidance signals for generating a signal indicating lateral deviations from a predetermined flight path,
   a glide slope receiver operable to receive guidance signals in a second predetermined band of frequencies and operable in response to said guidance signals for generating signals indicating vertical deviations from a predetermined glide slope path,
   means connected to said localizer receiver and to said glide slope receiver for indicating said localizer and glide slope deviation signals for course corrections,
   a microwave receiver operable to receive localizer and glide slope guidance signals within a predetermined band of microwave frequencies from ground stations,
   said microwave receiver including a frequency converter comprising means operable by combination with at least one fixed frequency to convert microwave frequency guidance signals received thereby to signals falling within the range between the lowest and the highest frequencies included within said first and second predetermined bands of frequencies,
   said microwave receiver being connected to supply said converted frequency signals respectively to said localizer receiver and to said glide slope receiver,
   said microwave receiver including means for receiving a fixed standard frequency signal from a ground station and operable to determine the fixed frequency for conversion of the microwave frequency guidance signals.

10. A system as claimed in claim 8 wherein
   said frequency converter means includes a frequency converter operable to convert microwave frequency signals received by said microwave receiver by subtraction of a fixed frequency,
   and said frequency converter means also includes a frequency translator connected from said converter to said localizer and glide slope receivers,
   said frequency translator being operable upon the signals converted by said frequency converter to translate different complementary sub-band portions of said converted predetermined band of microwave frequencies to said first and second predetermined bands of frequencies respectively for said localizer and glide slope receivers.

11. An improved system as claimed in claim 9 wherein
   there is included apparatus for a ground station having at least one microwave transmitter for transmitting localizer and glide slope guidance signals,
   said transmitter being operable to transmit a standard frequency signal having a fixed frequency relationship to the carrier frequencies of the guidance signals.

12. A system as claimed in claim 9 wherein
   said frequency converter comprises a single first mixer for receiving said microwave frequency guidance signals and for also receiving said fixed standard frequency signal,
   a frequency adjustable oscillator connected to supply a frequency signal to said first mixer for subtraction from said microwave frequency guidance signals and said fixed standard frequency signal to thereby accomplish said conversion of said guidance signals and to convert said standard frequency signal to provide a first standard frequency difference signal reduced in frequency by more than one order of magnitude,
   said microwave receiver including a second mixer and oscillator combination arranged to receive the first standard frequency difference signal from said first mixer and operable by a second subtraction to derive a second standard frequency difference signal which is reduced by another order of magnitude,
   a discriminator and average filter operable to detect deviations of said second standard frequency difference signal from an exact frequency value corresponding to the maintenance of the converted microwave frequency guidance signals at exact frequencies within said first and second predetermined bands of frequencies and operable to issue correction signals in response to any such deviations,
   and a connection from said discriminator and average filter to said frequency adjustable oscillator to automatically adjust the frequency output of said adjustable oscillator to maintain said exact frequency value.

13. A system as claimed in claim 12 wherein
   the maximum range of frequency variation by said frequency adjustable oscillator is within the maximum frequency range of discrimination by said discriminator and average filter.

14. A method of operating a guidance system providing both localizer and glide slope functions by means of signals transmitted over a single microwave band of frequencies comprising,
   transmitting localizer and glide slope signals from at least one ground station at frequencies within said microwave frequency band at absolute frequency differences corresponding to the usual frequency difference between the standard localizer and glide slope frequency bands,
   the difference between the lowest and the highest frequency within said band of microwave frequencies being greater than the difference between the lowest frequency within the localizer frequency band and the highest frequency within the glide slope frequency band,
   transmitting a fixed frequency standard signal within said microwave frequency band from said ground station,
   receiving said microwave frequency localizer and glide slope signals and said fixed frequency standard signal in a receiving station within an aircraft to be guided,
   converting said microwave localizer and glide slope signals to the standard VHF localizer and glide slope frequency bands by a direct and simultaneous fixed frequency subtraction while employing the fixed frequency standard signal to determine the fixed frequency for the frequency subtraction, and providing said converted signals to VHF localizer and glide slope receivers and indicators for use in making course corrections.

15. An improved guidance system comprising at least one ground station transmitter for transmitting radio guidance signals within a predetermined band of radio frequencies to a craft to be guided,
said transmitter including means for transmitting a separate fixed standard frequency signal for use by the receiver to enhance the discrimination function of the receiver in discriminating the desired guidance signals within said predetermined band of frequencies from other signals,
said transmitter being operable to transmit guidance signals within two predetermined bands of frequencies,
and said separate fixed standard frequency signal being within one of said predetermined bands of frequencies.

16. A system as claimed in claim 15 wherein
one of said predetermined bands of frequencies is in the C band,
and the other of said predetermined bands of frequencies is in the Ku band.

17. A system as claimed in claim 16 wherein
said separate fixed standard frequency signal is within the C band.

18. A system as claimed in claim 16 wherein
said separate fixed standard frequency is within the Ku band.

19. An improved guidance system comprising apparatus for a craft to be guided including
a guidance function receiver operable to receive guidance signals in a first predetermined band of frequencies and operable in response to said guidance signals for generating a signal indicating deviations from a predetermined path,
means connected to said receiver for indicating said deviation signals for course corrections,
a radio frequency receiver operable to receive guidance signals within a predetermined band of radio frequencies from ground stations,
said radio frequency receiver including a local oscillator means and a frequency converter means operable by combination with a frequency from said local oscillator means to convert the radio frequency guidance signals to signals falling within said first predetermined band of frequencies,
a connection means from said radio frequency receiver to supply said converted frequency signals to said guidance function receiver,
said radio frequency receiver including means for receiving a standard frequency signal from a ground station having a fixed frequency relationship to said radio frequency guidance signals and operable in response to said standard frequency signal to determine the local oscillator frequency for conversion of the radio frequency guidance signals.

20. A system as claimed in claim 19 wherein
said frequency converter means comprises a single first mixer for receiving said radio frequency guidance signals and for also receiving said standard frequency signal,
said local oscillator means comprising a frequency adjustable oscillator connected to supply a frequency signal to said first mixer for subtraction from said radio frequency guidance signals and said standard frequency signal to thereby accomplish said conversion of said guidance signals and to convert said standard frequency signal to provide a standard frequency difference signal,
a discriminator and average filter operable to detect deviations of said standard frequency difference signal from an exact frequency value corresponding to the maintenance of the converted radio frequency guidance signals at frequencies having exact differences from said standard frequency signal and operable to issue correction signals in response to any such deviations,
and a connection from said discriminator and average filter to provide said correction signals to said frequency adjustable oscillator to automatically adjust the frequency output of said adjustable oscillator to maintain said exact frequency value.

21. A system as claimed in claim 19 wherein
a threshold circuit means is provided within said radio frequency receiver for detecting the presence of a standard frequency signal having at least a predetermined signal strength value and operable to issue an output signal in response thereto,
said connection means from said radio frequency receiver to said guidance function receiver comprising a gating device connected for actuation by said threshold circuit and operable to complete the connection of said connection means through said gating device in response to said threshold circuit output signal.

* * * * *

UNITED STATES PATENT OFFICE
CERTIFICATE OF CORRECTION

Patent No. 3,715,757                    Dated February 6, 1973

Inventor(s) Donald J. Toman

It is certified that error appears in the above-identified patent and that said Letters Patent are hereby corrected as shown below:

Column 1, line 59, "signal" should read --signals--.
Column 2, line 37, "slide" should read --glide--;
          line 56, "switch" should read --switches--.
Column 5, after line 43, insert --' That co-pending patent application is now abandoned, but the subject matter is continued in a continuation-in-part patent application Serial No. 247,188 filed April 24, 1972 for a MICROWAVE AIRCRAFT GUIDANCE SYSTEM. --.

Signed and sealed this 29th day of January 1974.

(SEAL)
Attest:

EDWARD M. FLETCHER, JR.            RENE D. TEGTMEYER
Attesting Officer                  Acting Commissioner of Patents